United States Patent
Oh et al.

(10) Patent No.: US 10,102,422 B2
(45) Date of Patent: Oct. 16, 2018

(54) ELECTRONIC DEVICE BASED ON OPTICAL OBJECT RECOGNITION AND METHOD OF OPERATING THE SAME

(71) Applicant: Samsung Electronics Co., Ltd, Gyeonggi-do (KR)

(72) Inventors: Younghak Oh, Seoul (KR); Hyeonju Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/217,862

(22) Filed: Jul. 22, 2016

(65) Prior Publication Data
US 2017/0053159 A1  Feb. 23, 2017

(30) Foreign Application Priority Data
Jul. 23, 2015 (KR) ........................ 10-2015-0104395

(51) Int. Cl.
| G06K 9/00 | (2006.01) |
| G06F 3/01 | (2006.01) |
| G06F 3/03 | (2006.01) |
| G06F 3/0481 | (2013.01) |
| G06K 9/62 | (2006.01) |
| G10L 13/02 | (2013.01) |
| G10L 15/22 | (2006.01) |
| G06F 3/041 | (2006.01) |
| G06F 3/0346 | (2013.01) |
| G10L 13/027 | (2013.01) |

(52) U.S. Cl.
CPC ......... G06K 9/00335 (2013.01); G06F 3/017 (2013.01); G06F 3/0304 (2013.01); G06F 3/0346 (2013.01); G06F 3/041 (2013.01); G06F 3/0481 (2013.01); G06K 9/6201 (2013.01); G10L 13/02 (2013.01); G10L 15/22 (2013.01); *G10L 13/027* (2013.01)

(58) Field of Classification Search
CPC .............. G06K 9/00335; G06K 9/6201; G06F 3/0346; G06F 3/041; G06F 3/0481; G06F 3/017; G06F 3/0304; G10L 13/02; G10L 15/22; G10L 13/027
USPC ........................................................ 382/103
See application file for complete search history.

(56) References Cited

U.S. PATENT DOCUMENTS

| 7,903,838 | B2 | 3/2011 | Hudnut et al. | |
| 8,509,922 | B2 | 8/2013 | Yum et al. | |
| 2015/0036881 | A1* | 2/2015 | Sharma | G06F 17/30244 382/103 |
| 2015/0039318 | A1 | 2/2015 | Shin et al. | |
| 2016/0215430 | A1* | 7/2016 | Ha | G08C 17/02 |

* cited by examiner

*Primary Examiner* — Amandeep Saini

(57) ABSTRACT

An electronic device based on optical object recognition and a method of controlling the electronic device. The method of operating an optical object recognition-based an electronic device includes: executing an optical recognition function; recognizing an object outside the electronic device, via and optical sensor; searching for an Internet of Things (IoT) target device related to the recognized object; recommending an IoT action related to the recognized object; automatically preparing for and executing the IoT action; and performing voice feedback regarding the IoT action and the IoT target device.

20 Claims, 11 Drawing Sheets

ELECTRONIC DEVICE BASED ON OPTICAL OBJECT RECOGNITION AND METHOD OF OPERATING THE SAME

CROSS-REFERENCE TO RELATED APPLICATION(S) AND CLAIM OF PRIORITY

The present application claims the benefit under 35 U.S.C. § 119(a) of a Korean patent application filed on Jul. 23, 2015, in the Korean Intellectual Property Office and assigned Serial No. 10-2015-0104395, the entire disclosure of which is hereby incorporated by reference.

TECHNICAL FIELD

The present disclosure relates to an electronic device based on optical object recognition and a method of controlling the electronic device by voice, and more particularly, to voice-command-based remote controls of the Internet of Things (IoT) devices which are connected to each other through a short-range or remote range network.

BACKGROUND

The Internet of Things (IoT) refers to a network technology of connecting various things (objects), embedded with sensors and communication functions, to the Internet. The 'things' in the IoT sense can refer to a variety of embedded systems, e.g., a laptop computer, a desk top computer, home appliances, mobile devices, wearable devices, vehicles, etc.

Existing controls of IoT devices have supported only visual commands for a touch screen, a display, etc., and thus made it difficult for people who are weak-sighted or visually impaired to use IoT devices.

SUMMARY

To address the above-discussed deficiencies, it is a primary object to provide an electronic device based on optical object recognition, a method of operating the electronic device, and a method of controlling Internet of things (IoT) devices by voice.

In accordance with an aspect of the present disclosure, a method of operating an optical object recognition-based an electronic device is provided. The method includes: executing an optical recognition function; recognizing an object outside the electronic device, via and optical sensor; searching for an Internet of Things (IoT) target device related to the recognized object; recommending an IoT action related to the recognized object; automatically preparing for and executing the IoT action; and performing voice feedback regarding the IoT action and the IoT target device.

In accordance with another aspect of the present disclosure, an electronic device based on optical object recognition is provided. The electronic device includes: an optical sensor; an audio unit; a microphone; a communication unit; a storage unit; and a processor. The processor: executes an optical recognition function; recognizes an object outside the electronic device, via and optical sensor; searches for an Internet of Things (IoT) target device related to the recognized object; recommends an IoT action related to the recognized object; automatically prepares for and executes the IoT action; and controls the audio unit to perform voice feedback regarding the IoT action and the IoT target device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
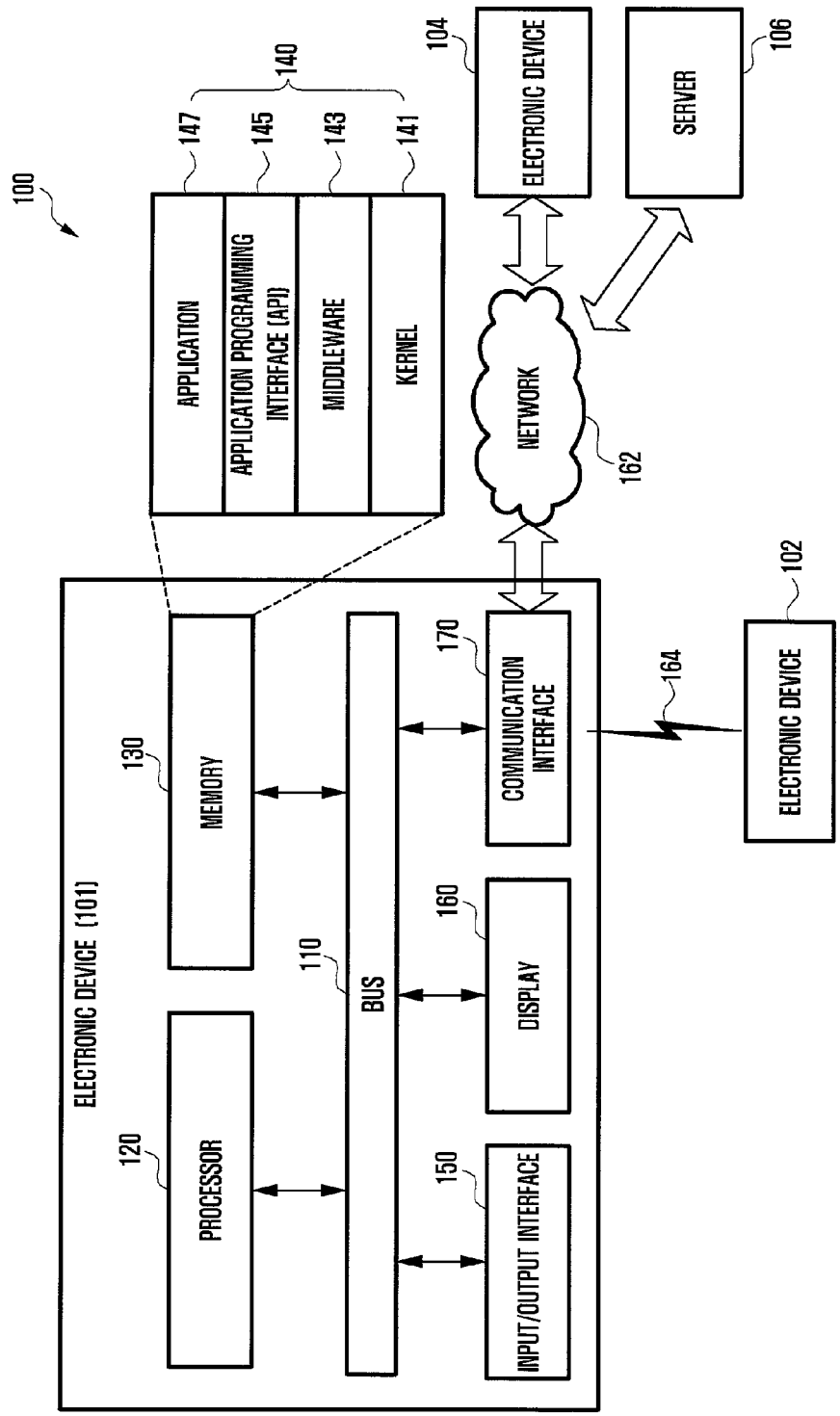
FIG. 1 illustrates a network environment including an electronic device according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, the present disclosure will be described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessary, an electronic tattoo, and a smart watch.

According to some embodiments, the electronic device may be a smart home appliance having a communication function. The smart home appliance may include at least one of a Television (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV®, or Google TV®), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

According to one embodiment of the present disclosure, a screen of an electronic device may be split into at least two windows according to a predefined split manner and displayed through a display of an electronic device. The windows are defined as split windows. According to one embodiment, the split windows are defined as windows displayed on a display of an electronic display not to be superposed one on another.

According to one embodiment, a popup window is defined as a window displayed on a display of an electronic device to hide or to be superposed on a portion of a screen under execution.

According to one embodiment of the present disclosure, an electronic device using split window and a popup window is capable of displaying two or more application execution screens or function execution screens. Thus, the split windows and the popup window are defined as a multi-window.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment 10 including an electronic device 101 according to various embodiments of the present disclosure. Referring to FIG. 1, the electronic device 100 includes a bus 110, a processor 120, a memory 130, an input/output interface 150, a display 160 and a communication interface 170.

The bus 110 may be a circuit connecting the above described components and transmitting communication (for example, a control message) between the above described components. The processor 120 receives commands from other components (for example, the memory 130, the input/output interface 150, the display 160, the communication interface 170) through the bus 110, analyzes the received commands, and executes calculation or data processing according to the analyzed commands. The memory 130 stores commands or data received from the processor 120 or other components (for example, the user input module 150, the display 160, or the communication interface 170) or generated by the processor 120 or other components. The memory 130 may include programming modules 140, for example, a kernel 141, middleware 143, an Application Programming Interface (API) 145, and an application 147. Each of the aforementioned programming modules may be implemented by software, firmware, hardware, or a combination of two or more thereof.

The kernel 141 controls or manages system resources (for example, the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components. The middleware 143 performs a relay function of allowing the API 145 or the application 147 to communicate with the kernel 141 to exchange data. Further, in operation requests received from the application 147, the middleware 143 performs a control for the operation requests (for example, scheduling or load balancing) by using a method of assigning a priority, by which system resources (for example, the bus 110, the processor 120, the memory 130 and the like) of the electronic device 100 can be used, to the application 134.

The API 145 is an interface by which the application 147 can control a function provided by the kernel 141 or the middleware 143 and includes, for example, at least one interface or function (for example, command) for a file control, a window control, image processing, or a character control. The user input module 150 can receive, for example, a command and/or data from a user, and transfer the received command and/or data to the processor 120 and/or the memory 130 through the bus 110. The display 160 can display an image, a video, and/or data to a user.

According to an embodiment, the display module 160 may display a graphic user interface image for interaction between the user and the electronic device 100. According to various embodiments, the graphic user interface image may include interface information to activate a function for correcting color of the image to be projected onto the screen. The interface information may be in the form of, for example, a button, a menu, or an icon. The communication interface 170 connects communication between the electronic device 100 and the external device (for example, electronic device 102, 104 or server 106). For example, the communication interface 170 may access a network 162 through wireless or wired communication to communicate with the external device. The wireless communication includes at least one of, for example, WIFI®, BlueTooth® (BT), Near Field Communication (NFC), a Global Positioning System (GPS), and cellular communication (for example, LTE, LTE-A, CDMA, WCDMA, UMTS, WiBro or GSM). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the server 106 supports driving of the electronic device 100 by performing at least one operation (or function) implemented by the electronic device 100. For example, the server 106 may include a communication control server module that supports the communication interface 170 implemented in the electronic device 100. For example, the communication control server module may include at least one of the components of the communication interface 170 to perform (on behalf of) at least one operations performed by the communication interface 170.

Figure 2:
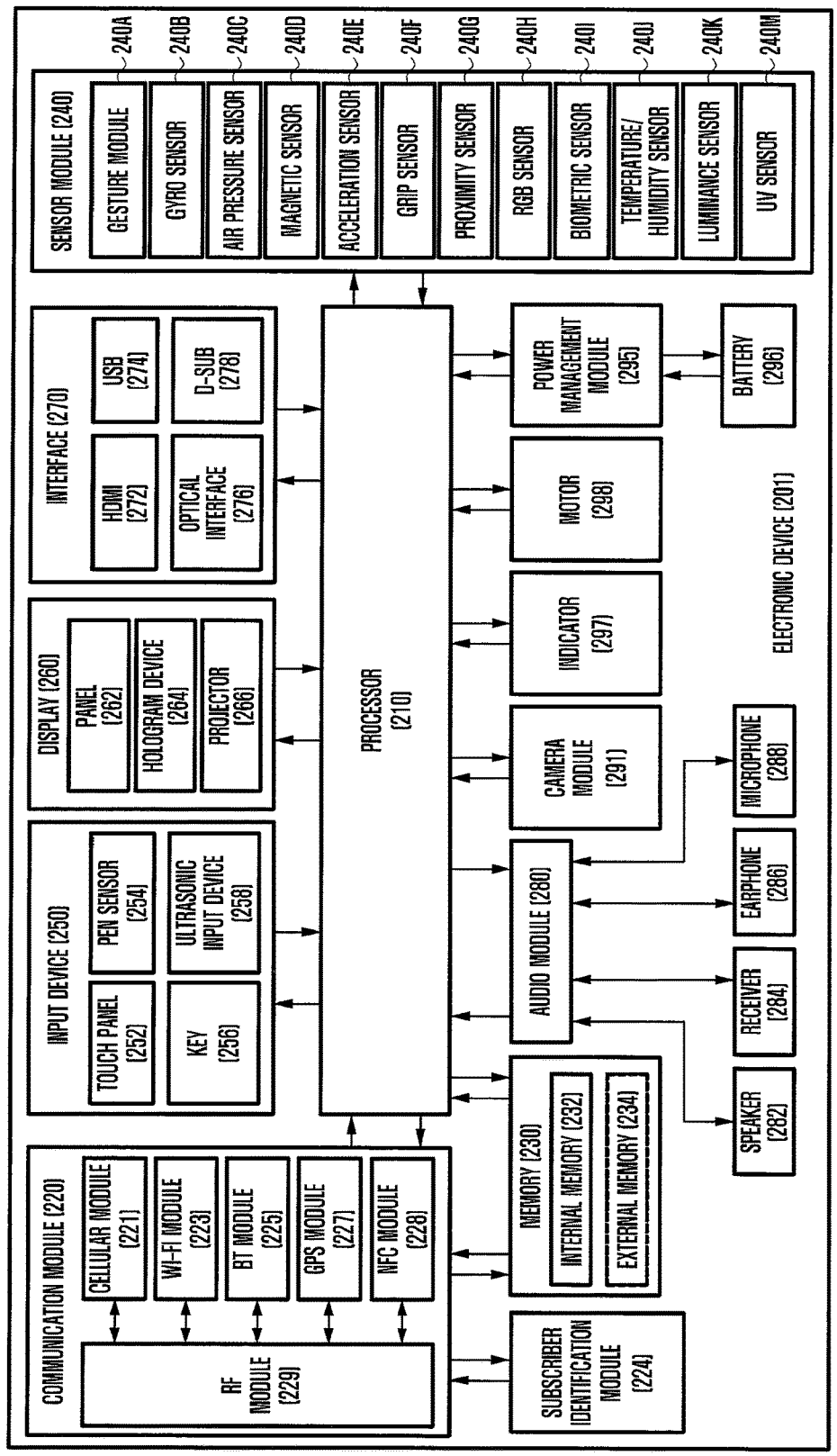
FIG. 2 illustrates a block diagram of an electronic device according to various embodiments of the present disclosure.

FIG. illustrates a block diagram of an electronic device 200 according to various embodiments of the present disclosure. The electronic device 200 may configure, for example, a whole or a part of the electronic device 100 illustrated in FIG. 1. Referring to FIG. 2, the electronic device 200 includes one or more Application Processors (APs) 210, a communication module 220, a Subscriber Identification Module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a System on Chip (SoC). According to an embodiment, the AP 210 may further include a Graphic Processing Unit (GPU).

The communication module 220 (for example, communication interface 170) transmits/receives data in communication between different electronic devices (for example, the electronic device 104 and the server 106) connected to the electronic device 200 (for example, electronic device 100) through a network. According to an embodiment, the communication module 220 includes a cellular module 221, a WiFi module 223, a BlueTooth (BT) module 225, a Global Positioning System (GPS) module 227, a Near Field Communication (NFC) module 228, and a Radio Frequency (RF) module 229.

The cellular module 221 provides a voice, a call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 221 may distinguish and authenticate electronic devices within a communication network by using a subscriber identification module (for example, the SIM card 224). According to an embodiment, the cellular module 221 performs at least some of the functions which can be provided by the AP 210. For example, the cellular module 221 may perform at least some of the multimedia control functions.

According to an embodiment, the cellular module 221 may include a Communication Processor (CP). Further, the cellular module 221 may be implemented by, for example, an SoC.

According to an embodiment, the AP 210 or the cellular module 221 (for example, communication processor) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GPS module 227, and the NFC module 228 may include, for example, a processor for processing data transmitted/received through the corresponding module. Although the cellular module 221, the WiFi module 223, the BT module 225, the GPS module 227, and the NFC module 228 are illustrated as blocks separate from each other in FIG. 8, at least some (for example, two or more) of the cellular module 221, the WiFi module 223, the BT module 225, the GPS module 227, and the NFC module 228 may be included in one Integrated Chip (IC) or one IC package according to one embodiment. For example, at least some (for example, the communication processor corresponding to the cellular module 221 and the WiFi processor corresponding to the WiFi module 223) of the processors corresponding to the cellular module 221, the WiFi module 223, the BT module 225, the GPS module 227, and the NFC module 228 may be implemented by one SoC.

The RF module 229 transmits/receives data, for example, an RF signal. Although not illustrated, the RF module 229 may include, for example, a transceiver, a Power Amp Module (PAM), a frequency filter, a Low Noise Amplifier (LNA) or the like. Further, the RF module 229 may further include a component for transmitting/receiving electronic waves over a free air space in wireless communication, for example, a conductor, a conducting wire, or the like. Although the cellular module 221, the WiFi module 223, the BT module 225, the GPS module 227, and the NFC module 228 share one RF module 229 in FIG. 2, at least one of the cellular module 221, the WiFi module 223, the BT module 225, the GPS module 227, and the NFC module 228 may transmit/receive an RF signal through a separate RF module according to one embodiment.

The SIM card 224 is a card including a Subscriber Identification Module and may be inserted into a slot formed in a particular portion of the electronic device. The SIM card 224 includes unique identification information (for example, Integrated Circuit Card IDentifier (ICCID)) or subscriber information (for example, International Mobile Subscriber Identity (IMSI).

The memory 230 (for example, memory 130) may include an internal memory 232 or an external memory 234. The internal memory 232 may include, for example, at least one of a volatile memory (for example, a Random Access Memory (RAM), a dynamic RAM (DRAM), a static RAM (SRAM), a synchronous dynamic RAM (SDRAM), and the like), and a non-volatile Memory (for example, a Read Only Memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 may be functionally connected to the electronic device 200 through various interfaces. According to an embodiment, the electronic device 200 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric sensor 240I, a temperature/humidity sensor 240J, an illumination (light) sensor 240K, and a Ultra Violet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an Infra-Red (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which can detect an acoustic wave by a microphone (for example, microphone 288) of the electronic device 200 through an input means generating an ultrasonic signal to identify data and can perform wireless recognition. According to an embodiment, the electronic device 200 receives a user input from an external device (for example, computer or server) connected to the electronic device 200 by using the communication module 220.

The display 260 (for example, display 160) includes a panel 262, a hologram device 264, and a projector 266. The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 200. According to an embodiment, the display 260 may further include a control circuit for controlling the panel 262, the hologram device 264, and the projector 266.

The interface 270 includes, for example, a High-Definition Multimedia Interface (HDMI) 272, a Universal Serial Bus (USB) 274, an optical interface 276, and a D-subminiature (D-sub) 278. The interface 270 may be included in, for example, the communication interface 170 illustrated in FIG. 1. Additionally or alternatively, the interface 290 may include, for example, a Mobile High-definition Link (MHL) interface, a Secure Digital (SD) card/Multi-Media Card (MNIC), or an Infrared Data Association (IrDA) standard interface.

The audio module 280 bi-directionally converts a sound and an electronic signal. At least some components of the audio module 280 may be included in, for example, the user input module 150 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an embodiment, the camera module 291 may include one or more image sensors (for example, a front sensor or a back sensor), an Image Signal Processor (ISP) (not shown) or a flash (for example, an LED or xenon lamp).

The power managing module 295 manages power of the electronic device 200. Although not illustrated, the power managing module 295 may include, for example, a Power Management Integrated Circuit (PMIC), a charger Integrated Circuit (IC), or a battery or fuel gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 296, or a voltage, a current, or a temperature during charging. The battery 296 may store or generate electricity and supply power to the electronic device 200 by using the stored or generated electricity. The battery 296 may include a rechargeable battery or a solar battery. The indicator 297 shows particular statuses of the electronic device 200 or a part (for example, AP 210) of the electronic device 200, for example, a booting status, a message status, a charging status and the like. The motor 298 converts an electrical signal to a mechanical vibration.

Although not illustrated, the electronic device 200 may include a processing unit (for example, GPU) for supporting a module TV. The processing unit for supporting the mobile TV may process, for example, media data according to a standard of Digital Multimedia Broadcasting (DMB), Digital Video Broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
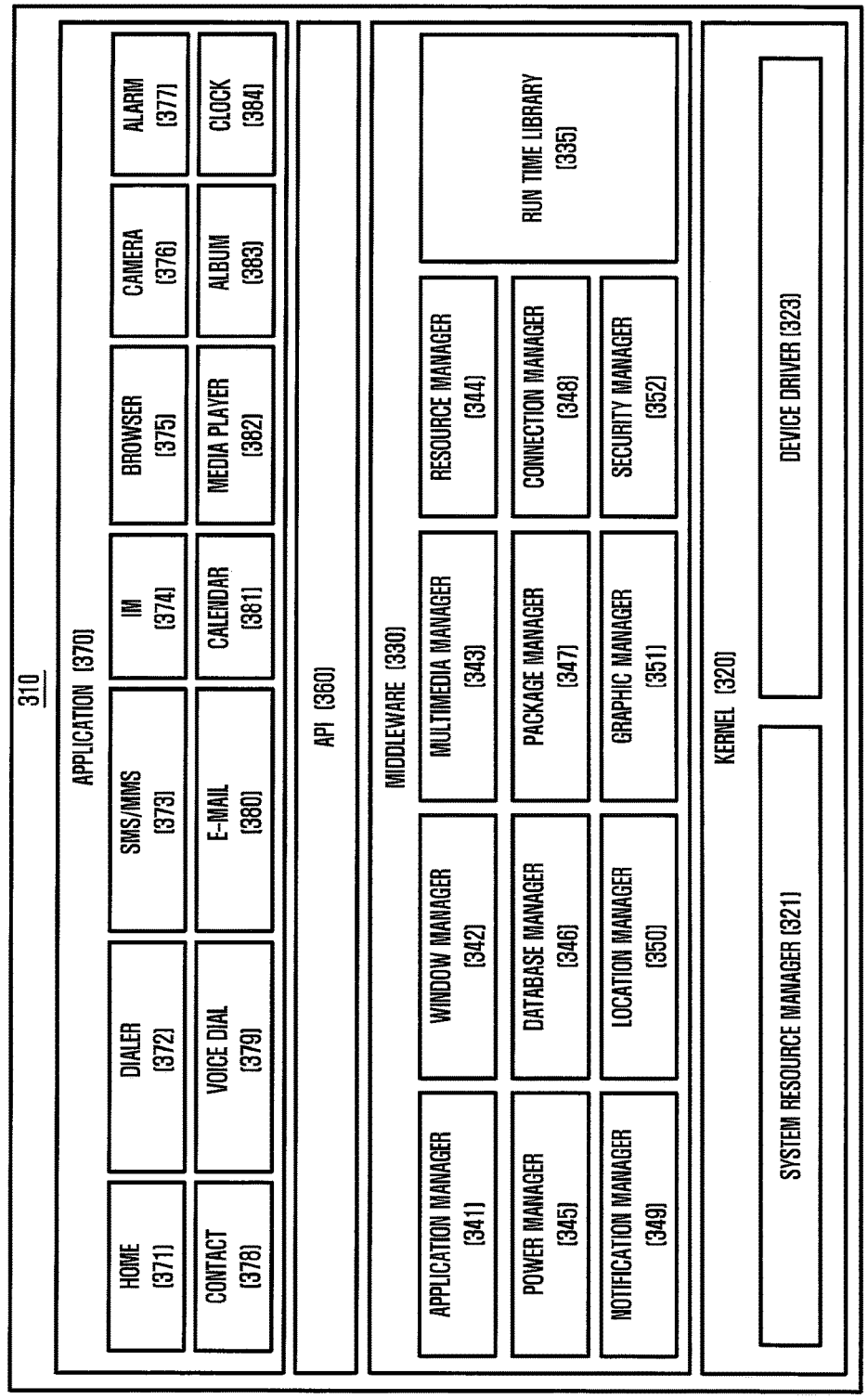
FIG. 3 illustrates a block diagram of a program module according to various embodiments of the present disclosure.

FIG. 3 illustrates a block diagram of a programming module 310 according to an embodiment. The programming module 310 (for example, programming module 140) may be included (stored) in the electronic device 100 (for example, memory 130) illustrated in FIG. 1. At least some of the programming module 310 may be formed of software, firmware, hardware, or a combination of at least two of software, firmware, and hardware. The programming module 310 may be executed in the hardware (for example, electronic device 200) to include an Operating System (OS) controlling resources related to the electronic device (for example, electronic device 100) or various applications (for example, applications 370) driving on the OS. For example, the OS may be Android®, iOS®, Windows®, Symbian OS™, Tizen®, Samsung Bada® or the like. Referring to FIG. 3, the programming module 310 includes a kernel 320, a middleware 330, an Application Programming Interface (API) 360, and applications 370.

The kernel 320 (for example, kernel 141) includes a system resource manager 321 and a device driver 323. The system resource manager 321 may include, for example, a process manager, a memory manager, and a file system manager. The system resource manager 321 performs a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver. The middleware 330 includes a plurality of modules prepared in advance to provide a function required in common by the applications 370. Further, the middleware 330 provides a function through the API 360 to allow the application 370 to efficiently use limited system resources within the electronic device. For example, as illustrated in FIG. 3, the middleware 330 (for example, middleware 143) includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. The runtime library 335 includes, for example, a library module used by a compiler to add a new function through a programming language while the application 370 is executed. According to an embodiment, the runtime library 335 executes input and output, management of a memory, a function associated with an arithmetic function and the like.

The application manager 341 manages, for example, a life cycle of at least one of the applications 370. The window manager 342 manages GUI resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370.

The power manager 345 operates together with a Basic Input/Output System (BIOS) to manage a battery or power and provides power information required for the operation. The database manager 346 manages generation, search, and change of a database to be used by at least one of the applications 370. The package manager 347 manages an installation or an update of an application distributed in a form of a package file.

The connection manager 348 manages, for example, a wireless connection such as WiFi or Bluetooth. The notification manager 349 displays or notifies a user of an event such as an arrival message, an appointment, a proximity alarm or the like, in a manner that does not disturb the user. The location manager 350 manages location information of the electronic device. The graphic manager 351 manages a graphic effect provided to the user or a user interface related to the graphic effect. The security manager 352 provides a general security function required for a system security or a user authentication. According to an embodiment, when the electronic device (for example, electronic device 100 or 200) has a call function, the middleware 330 may further include a telephony manager for managing a voice of the electronic device or a video call function. The middleware 330 may generate a new middleware module through a combination of various functions of the aforementioned internal component modules and use the generated new middleware module. The middleware 330 may provide a module specified for each type of operating system to provide a differentiated function. Further, the middleware 330 may dynamically delete some of the conventional components or add new components. Accordingly, some of the components described in the embodiment of the present disclosure may be omitted, replaced with other components having different names but performing similar functions, or other components may be further included.

The API 360 (for example, API 145) is a set of API programming functions, and may be provided with a different configuration according to an operating system. For example, in Android or iOS, a single API set may be provided for each platform. In Tizen, two or more API sets may be provided. The applications 370, which may include an application similar to the application 134, may include, for example, a preloaded application and/or a third party application. The applications 370 may include a home application 371 a dialer application 372, a Short Messaging Service (SMS)/Multimedia Messaging Service (MIMS) application 373, an Instant Messaging (IM) application 374, a browser application 375, a camera application 376, an alarm application 377, a contact application 378, a voice dial application 379, an email application 380, a calendar application 381, a media player application 382, an album application 383, and a clock application 384. However, the present embodiment is not limited thereto, and the applications 370 may include any other similar and/or suitable application. At least a part of the programming module 310 can be implemented by commands stored in computer-readable storage media. When the commands are executed by at least one processor, e.g. the AP 210, at least one processor can perform functions corresponding to the commands. The computer-readable storage media may be, for example, the memory 230. At least a part of the programming module 310 can be implemented, e.g. executed, by, for example, the AP 210. At least a part of the programming module 310 may include, for example, a module, a program, a routine, a set of instructions, and/or a process for performing at least one function.

The titles of the aforementioned elements of the programming module, e.g. the programming module 300, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

Figure 4:
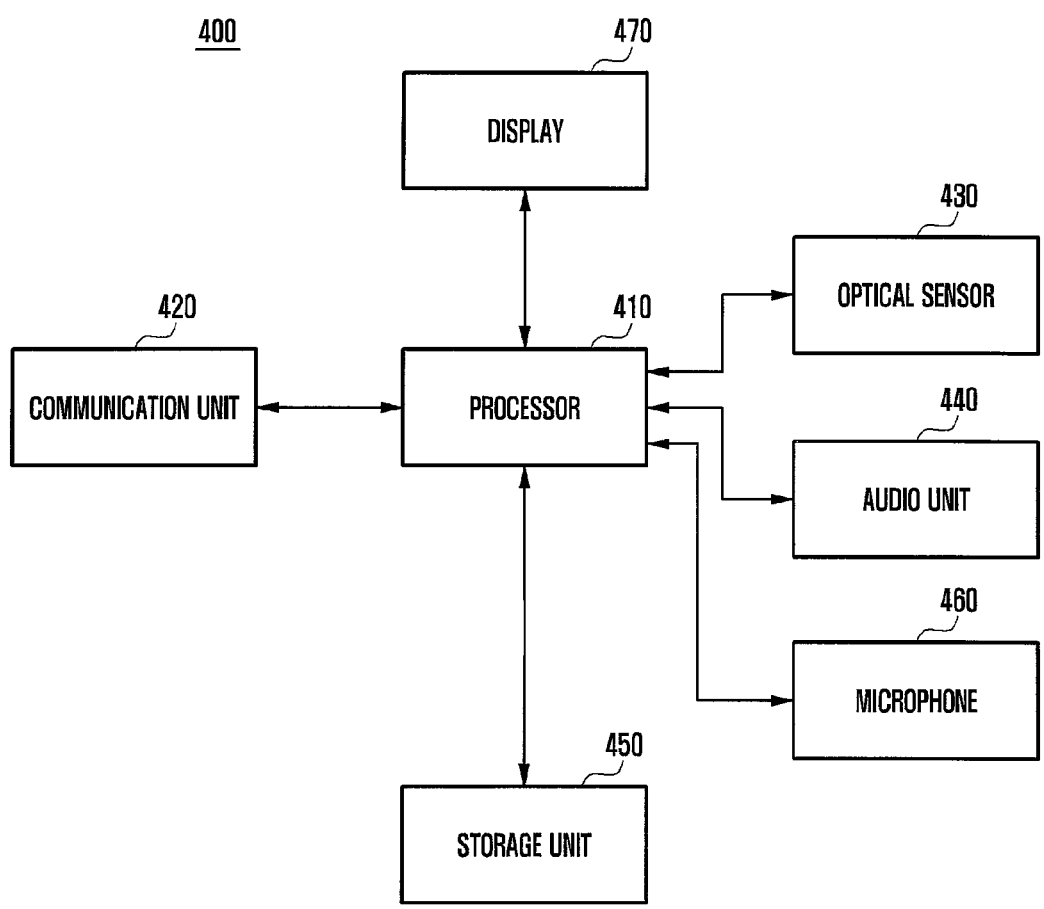
FIG. 4 illustrates a block diagram of an electronic device capable of performing optical object recognition according to various embodiments of the present disclosure.

FIG. 4 illustrates a block diagram of an electronic device 400 capable of performing optical object recognition according to various embodiments of the present disclosure.

As shown in FIG. 4, the electronic device 400 capable of performing optical object recognition may be the same as the electronic device 101 shown in FIG. 1 and the electronic device 201 shown in FIG. 2. The electronic device 400 includes the same components as the electronic device 101 shown in FIG. 1 and the electronic device 201 shown in FIG. 2.

The electronic device 400 may be one or more of a user-shooting type, an always logging type), and a fixed location type, according to types of optical sensors.

A user-shooting type electronic device may refer to a device with an optical instrument (e.g., a camera) that the user needs to directly operate, for example, a mobile phone, a tablet PC, a wearable device, etc.

An always logging type electronic device may refer to a device that is capable of shooting continuously, periodically or in real-time, via an optical instrument (e.g., a camera), from among wearable devices (e.g., smart eyeglasses, a smart-clip, etc.).

A fixed location type electronic device may refer to a device that is fixed to a place, a large-sized home appliance, etc., and is capable of shooting continuously, via an optical instrument (e.g., a camera).

The electronic device 400 is capable of including a processor 410, a communication unit 420, an optical sensor 430, an audio unit 440, a storage unit 450, a microphone 460 and a display 470.

The processor 410 may be configured to be, in configuration, identical or similar to the processor 120 shown in FIG. 1 or the AP 210 shown in FIG. 2.

The processor 410 is capable of running an operating system or applications, controlling a number of hardware modules or software modules, performing data processing and operations, etc.

The processor 410 may be implemented with a system on chip (SoC). In an embodiment, the processor 410 may further include a graphic processing unit (GPU) and/or an image signal processor.

The processor 410 may be configured to include at least part of the components shown in FIG. 4, e.g., the communication unit 420. The processor 410 is capable of loading commands or data from at least one of the components, e.g., a storage unit 450, on a volatile memory, processing the loaded commands and data thereon, and storing the processed result and other data in the storage unit 450.

In various embodiments, when the optical sensor 430 detects an object, the processor 410 is capable of computing outward form information regarding the detected object. The processor 410 compares the computed, outward form information regarding the object with outward form information regarding objects in a data base (DB) stored in the storage unit 450, and identifies the detected object. In various embodiments, when the optical sensor 430 detects an object, the processor 410 is capable of recognizing information regarding the detected object, e.g., a trademark, a band, a logo, a tag, etc. The processor 410 compares the recognized information regarding the object, e.g., a trademark or a tag, with information regarding objects in a data base (DB) stored in the storage unit 450, e.g., a trademark, a band, a logo, a tag, etc., and identifies the detected object. An example of the object is clothes containing a trademark, a band, a logo, a tag, etc.

In order to recognize a trademark, a tag, etc. of an object, the electronic device 400 may store, in the storage unit 450, an algorithm capable of recognizing characters, figures, fonts, images, etc., via the optical sensor 430, e.g., an optical character recognition (OCR) algorithm.

When recognizing the detected object, the electronic device 400 is capable of searching for an IoT target device or a network connection device which can be linked with an object via the communication unit 420, and recommending the searched IoT target device to the user, under the control of the processor 410. The electronic device 400 is capable of outputting details of the recommended IoT target device to the display 470 and/or the audio unit 440 under the control of the processor 410.

The process of recommending the searched IoT target device to the user by the electronic device 400 is performed because, when the electronic device 400 is a fixed location type electronic device, such as a CCTV, it may not perform functions other than the CCTV function. The electronic device 400 is capable of recognizing an IoT target device via the optical sensor 430. The electronic device 400 is capable of recognizing an IoT target device using the outward form information as it recognizes an object via the optical sensor 430. For example, the electronic device 400 is capable of simultaneously recognizing a 'washing machine' as an IoT target device and 'clothes' as an object via the optical sensor 430.

In another embodiment, an IoT target device may be recommended, via a context analysis program or a semantic inference program, based on a recognized object. For example, when the electronic device 400 recognizes only 'clothes' as an object, it may recommend a 'washing machine,' 'iron,' etc. as an IoT target device, via a context analysis program or a semantic inference program under the control of the processor 410. The context analysis program or the semantic inference program may be stored in the storage unit 450 of the electronic device 400 or may be received from external devices via the communication unit 420.

The electronic device 400 is capable of storing information regarding one or more IoT target devices in a database (IoT target device DB) in the storage unit 450. In another embodiment, the electronic device 400 is capable of searching for an IoT target device DB stored in an external device via the communication unit 420. The information regarding IoT target devices may contain outward form information regarding IoT target devices or information regarding functions to be performed using objects.

For example, when the electronic device 400, e.g., a CCTV, detects 'clothes' as an object, it may recommend a 'washing machine' as an IoT target device to the user.

When the electronic device 400 identifies a type of object, it is capable of recommending its IoT action to the user.

The electronic device 400 is capable of outputting details regarding its recommended IoT action to the display 470 and/or the audio unit 440 under the control of the processor 410.

The electronic device 400 is capable of creating a database (DB) with scenarios related to IoT actions to be recommended and storing the database in the storage unit 450.

The processor 410 is capable of cross-analyzing the features of IoT target devices and optically recognized objects based on a DB with scenarios related to IoT actions stored in the storage unit 450, and recommending an appropriate IoT action to the user.

The communication unit 420 is capable of communicating with a wired/wireless network or an external device. The communication unit 420 may be configured to include components identical or similar to those in a communication interface 170 shown in FIG. 1 or a communication module 220 shown in FIG. 2. The communication unit 420 may include a cellular module, a Wi-Fi module, Bluetooth module, a GNSS module (e.g., GPS module, a GLONASS module, a BeiDou module, or a Galileo module, an NFC module and a radio frequency (RF) module.

The cellular module is capable of providing various services via a communication network, e.g., a voice call, a video call, a text message service, an Internet service, etc. In an embodiment, the cellular module may perform the identification and authentication of the electronic device 400 in a communication network, using a subscriber identity module (e.g., an SIM card). In an embodiment, the cellular module may perform part of the functions provided by the processor 410. In an embodiment, the cellular module is capable of including a communication processor (CP).

The WiFi module, Bluetooth module, GNSS module, and NFC module each are capable of including a processor for data transmitted/received by the corresponding modules. In an embodiment, at least part (e.g., two or more) of the following: cellular module, WiFi module, Bluetooth module, GNSS module and NFC module may be implemented with a single integrated chip (IC) or IC package.

The RF module is capable of performing transmission/reception of communication signals (e.g., RF signals). The RF module is capable of including a transceiver, a power amp module (PAM), a frequency filter, a low noise amplifier (LNA), an antenna, etc. In another embodiment, at least one of the following: cellular module, WiFi module, Bluetooth module, GNSS module and NFC module may perform transmission/reception of RF signals via a separate RF module.

The subscriber identity module (SIM) may be implemented with a card with an SIM and/or an embedded SIM. The SIM may contain unique identification information (e.g., integrated circuit card identifier (ICCID)) or subscriber information (e.g., international mobile subscriber identity (IMSI)).

The optical sensor 430 may be configured to include components identical or similar to those of the camera module 291 shown in FIG. 2.

The optical sensor 430 may refer to a device capable of taking still images and moving images. In an embodiment, the optical sensor 430 may include one or more image sensors (e.g., a sensor on the front side, a sensor on the back), lenses, an image signal processor (ISP), a flashlight (e.g., an LED lamp or a xenon lamp), etc.

When the optical sensor 430 detects an object outside the electronic device 400, the processor 410 is capable of identifying the object, referring to an object outward form information data base (DB) containing outward form information regarding one or more objects, stored in the storage unit 450.

When the optical sensor 430 detects an object, the processor 410 is capable of computing outward form information regarding the detected object. The processor 410 compares the computed, outward form information regarding the object with outward form information regarding objects in the data base (DB) stored in the storage unit 450, and identifies the detected object.

In another embodiment, when the electronic device 400 has not stored the object outward form information DB in the storage unit 450, it may search for an object outward form information DB in the network via the communication unit 420. The processor 410 compares the computed, outward form information regarding the detected object with the searched, object outward form information DB and identifies the detected object.

In another embodiment, when the electronic device 400 has not stored the object outward form information DB in the storage unit 450, it may search for an object outward form information DB in the network via the communication unit 420. The processor 410 downloads the searched, object outward form information DB from the network and stores in the storage unit 450.

The audio unit 440 is capable of converting sounds to electrical signals and vice versa. The audio unit 440 may be configured in such a way that part of the components is included in the input/output interface 150 shown in FIG. 1 or the audio module 280 shown in FIG. 2.

When the processor 410 detects (recognizes) an object via the optical sensor 430, it computes outward form information regarding the detected object. The processor 410 compares the computed, outward form information regarding the object with outward form information regarding objects in the data base (DB) and identifies the detected object.

When identifying the detected object, the electronic device 400 is capable of recommending an IoT action to the user. The electronic device 400 is capable of outputting details regarding the recommended IoT action to the audio unit 440 under the control of the processor 410.

For example, when the optically recognized object is clothes and the IoT target device is a washing machine, the electronic device 400 may recommend an IoT action related to a guidance of the washing machine, outputting a voice guidance message as follows through the audio unit 440.

"A washing machine is 3 m ahead. After putting clothes in the washing machine and please close the door." In addition to the voice guidance message, a beep sound for guiding the user to the washing machine may also be output.

When the number of recommended IoT actions is two or more, the user may set one of the IoT actions thorough user inputs, such as a voice, a gesture, a touch input, etc.

For example, "Please shake the electronic device from side to side if you want to wash the clothes you are holding, or swipe a touch from the top to the bottom on the electronic device if you want to store the clothes."

The electronic device 400 may receive user inputs, such as a voice, a gesture, a touch input, etc., via the microphone 460, an input device (not shown, corresponding to the input device 250 shown in FIG. 2), a sensor module (not shown, corresponding to the sensor module 240 shown in FIG. 2), etc., which are installed to the electronic device 400.

In another embodiment, the electronic device 400 may receive user inputs, such as a voice input, a gesture input, a touch input, etc., via the communication unit 420, from an external electronic device which includes a microphone, an input device (not shown, corresponding to the input device 250 shown in FIG. 2), a sensor module (not shown, corresponding to the sensor module 240 shown in FIG. 2), etc.

The processor 410 is capable of: identifying user inputs, such as a voice input, a gesture input, a touch input, etc., received via the microphone 460, an input device (not shown, corresponding to the input device 250 shown in FIG. 2), a sensor module (not shown, corresponding to the sensor module 240 shown in FIG. 2), etc., which are installed to the electronic device 400; and controlling an IoT action or recommending the IoT action to the user.

In another embodiment, when the processor 410 receives user inputs, such as a voice, a gesture, a touch input, etc., via the communication unit 420, from an external electronic device which includes a microphone, an input device (not shown, corresponding to the input device 250 shown in FIG. 2), a sensor module (not shown, corresponding to the sensor module 240 shown in FIG. 2), etc., it is capable of controlling an IoT action or recommending the IoT action to the user.

In various embodiments, the audio unit 440 may be configured to include the microphone 460. The audio unit 440 recognizes a voice or sound via the microphone 460. The electronic device 400 may include voice agent software or an application which allows the user to communicate, by voice, with the electronic device 400 via the audio unit 440 or microphone 460. The voice agent software or application may be stored in the storage unit 450.

In another embodiment, the electronic device 400 may use voice agent software or an application included in an external device, via the communication unit 420, which allows the user to communicate, by voice, with the electronic device 400 via the audio unit 440 or microphone 460. The voice agent software or application is capable of recognizing a voice or sound transmitted through the audio unit 440 or microphone 460 and also inferring the context of the voice.

In another embodiment, in addition to the voice agent software or application, the electronic device 400 may further include semantic software or an application capable of inferring context of a voice.

The storage unit 450 (e.g., the memory 130 shown in FIG. 1 or the memory 230 shown in FIG. 2) may include a built-in memory or an external memory. The built-in memory may include at least one of the following: a volatile memory (e.g., a dynamic RAM (DRAM), a static RAM (SRAM), or a synchronous dynamic RAM (SDRAM)); a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM (e.g., a NAND flash memory, or an NOR flash memory); a hard drive; a solid state drive (SSD); etc.

The external memory may further include a flash drive, e.g., a compact flash (CF), a secure digital (SD), a micro secure digital (Micro-SD), a mini secure digital (Mini-SD), an extreme digital (xD), a multi-media card (MMC), a memory stick, etc.

The external memory may be functionally and/or physically connected to the electronic device 400 via various types of interfaces.

The storage unit 450 is capable of storing: an IoT target device DB containing information regarding one or more IoT target devices; an object outward form information DB containing outward form information regarding one or more objects; a DB of scenarios related to IoT actions containing information regarding one or more IoT actions (shortened to an IoT action-related scenario DB); voice agent software or application; and semantic software or application capable of inferring context.

The IoT target device DB, object outward form information DB, IoT action-related scenario DB, voice agent software or application, and semantic software or application capable of inferring context may be stored in the storage unit 450 in the process of manufacturing the electronic device or may be downloaded from an external device via the communication unit 420.

For example, the storage unit 450 may store an IoT action-related scenario DB as in the following table 1. The IoT action-related scenario DB stores operations or functions that the electronic device 400 can perform, through IoT target devices, based on its recognized object and IoT target device. The IoT action-related scenario DB may be created by accumulating a user's action patterns.

kitchen sink, a desk, etc., and the electronic device 400 has been equipped with an additional accessory capable of performing short-range communication (e.g., a beacon, an AP, a speaker), an optical sensor, etc., the IoT actions may be classified into low tech IoT actions.

The display 470 (e.g., a display 160 shown in FIG. 1 or a display 260 shown in FIG. 2) may be configured to include a panel, a hologram unit or a projector. The panel may be implemented to be flexible, transparent, or wearable. The panel may be integrated into a module with a touch panel. The hologram unit may show a stereoscopic image in the air by using light interference. The projector may display an image by projecting light onto a screen. The screen may be located inside or outside of the electronic device 400. In an embodiment, the display 470 may further include a control circuit for controlling the panel, the hologram unit, or the projector.

The electronic device 400 is capable of outputting a message or a detail of a recommended IoT action to the display 470 and/or the audio unit 440 under the control of the processor 410.

Figure 5:
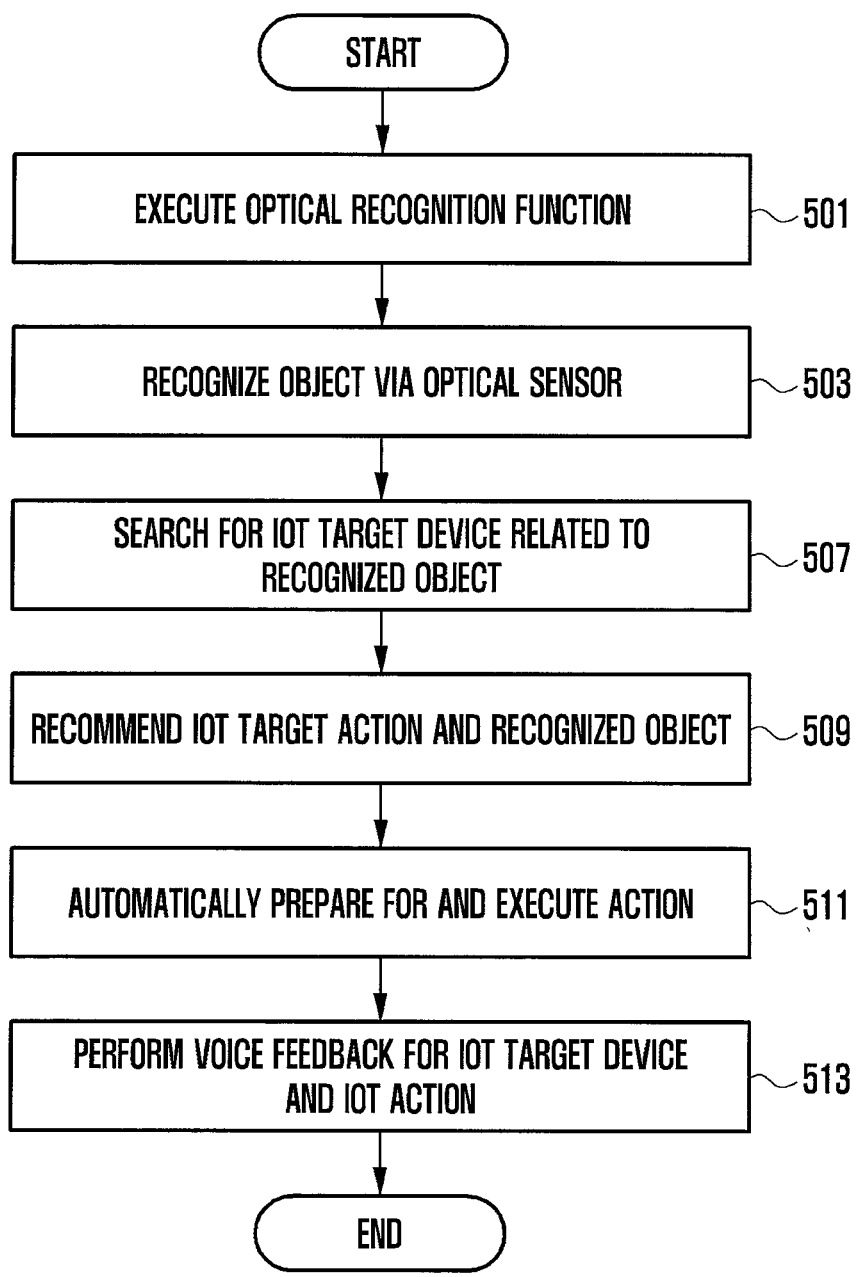
FIG. 5 illustrates is a flowchart that describes a method of operating an electronic device according to various embodiments of the present disclosure.

FIG. 5 illustrates a flowchart that describes a method of operating an electronic device 400 according to various embodiments of the present disclosure.

TABLE 1

| Optically recognized object | Electronic device | IoT action scenario DB |
|---|---|---|
| Clothes | Washing machine | 1. Object: quality of clothes, washing method analysis<br>2. IoT action: automatic setting of washing method to meet the feature of clothes<br>For example,)<br>Material: 65% cotton, 35% polyester<br>Wash in water at temperature 30° C.<br>Use a neutral detergent<br>Can be ironed<br>This product requires hand washing |
| Food | Refrigerator | 1. Object: check type of food, frozen/cold stored food<br>2. IoT action: automatic opening of freezer/refrigerator door, notification of expiry date, notification of storage temperature<br>For example,)<br>Apples, 14 days left until expiry date<br>Cold compartment temperature 12° C., it's the correct temperature to store apples |
| | Microwave oven | 1. Object: check type of food, cooking method<br>2. IoT action: automatically recommend and set menus and cooking time. After comparing with other food in the refrigerator and calculating calories, recommend a possible cooking method |
| Dishes | Microwave oven | 1. Object: check size and material of a dish<br>2. IoT action: Automatic setting of a cooking time. Providing a warning for unsuitable material (e.g., platted ceramics, canned product, etc.) |
| | Cupboard | 1. Object: check size and type of a dish<br>2. IoT action: Set the condition as a user's using location/drawer, and guiding the direction |
| Trash, Miscellaneous articles | Robotic vacuum cleaner | 1. Object: Detect a pollution level greater than or equal to a preset value<br>2. IoT action: Automatic starting cleaning |
| USB | TV | 1. Object: Detect connectable USB storage media<br>2. IoT action: Guide the user to the direction connectable to USB |

As described in the table 1, scenarios of target IoT actions may vary according to types of electronic devices. IoT actions may be classified into high tech IoT actions and low tech IoT actions. The high tech IoT actions refer to actions which directly analyze functions and perform IoT actions. The low tech IoT actions refer to simple actions informing users of locations, usages, etc. For example, when the object is a thing, such as a wardrobe, a cupboard, a trash can, a The electronic device 400 is capable of executing an optical recognition function under the control of the processor 410 in operation 501. The electronic device 400 is capable of executing an optical recognition function, automatically or according to user input. The optical recognition function may be a function for recognizing a thing via the optical sensor 430.

The electronic device 400 is capable of recognizing an object outside the electronic device 400 (an external object) via the optical sensor 430 under the control of the processor 410 in operation 503.

When the processor 410 recognizes the object detected via the optical sensor 430, it is capable of computing outward form information regarding the detected object in operation 503. The processor 410 compares the computed, outward form information regarding the detected object with outward form information regarding objects in a data base (DB) stored in the storage unit 450, and identifies the detected object.

The electronic device 400 is capable of searching for an IoT target device related to the recognized object under the control of the processor 410 in operation 507. The searched, IoT target device may be the electronic device 400 or an external electronic device outside the electronic device 400.

The electronic device 400 computes outward form information regarding an IoT target device recognized through the optical sensor 430, and identifies an IoT target device, via the communication unit 420 or by using an IoT target device DB, according to the computed, outward form information regarding an IoT target device under the control of the processor 410 in operation 507.

The electronic device 400 is capable of recommending an action of an IoT target device related to the recognized object under the control of the processor 410 in operation 509. When the electronic device 400 searches for an IoT target device related to the recognized object in operation 507, it is capable of recommending an IoT action that the IoT target device can perform in connection with the recognized object in operation 509. An example of the IoT action may be operations described in table 1.

When the electronic device 400 recognizes an object and an IoT target device, it is capable of recommending an IoT action that the IoT target device can perform in connection with the recognized object, referring to a DB with scenarios related to IoT actions, under the control of the processor 410 in operation 509.

The DB with scenarios related to IoT actions refers to a database (DB) storing functions or operations which can be performed by IoT target devices or a DB created as a semantic inference program accumulates data related to a user's action patterns.

The IoT actions refer to information regarding functions that an IoT target device can perform using a recognized object.

The electronic device 400 is capable of automatically preparing for and executing an IoT action of an IoT target device under the control of the processor 410, in operation 511.

The electronic device 400 is capable of performing voice feedback related to an IoT action and an IoT target device to the audio unit 440 under the control of the processor 410 in operation 513. An example of voice feedback may be a guide message for an IoT action and an IoT target device.

Figure 6:
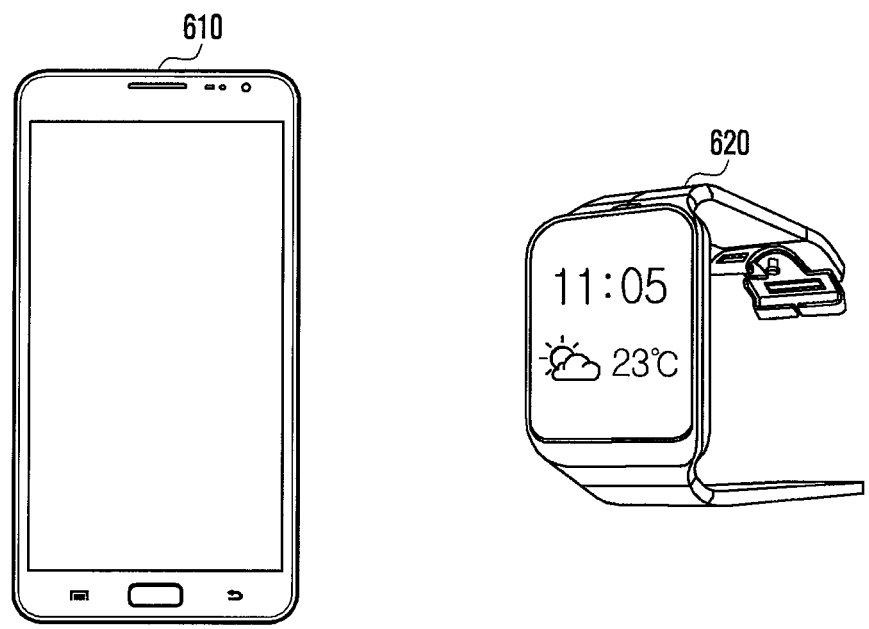
FIG. 6 illustrates a diagram of a user-shooting type electronic device according to various embodiments of the present disclosure.

FIG. 6 illustrates a diagram of a user-shooting type electronic device 400 according to various embodiments of the present disclosure.

The user-shooting type electronic device 400 may be a device that is capable of driving the optical sensor 430 and a camera and performing an optical recognition function only when the user makes a request.

The user-shooting type electronic device 400 includes the optical sensor 430 such as a camera. An example of the user-shooting type electronic device 400 is a device (e.g., a smartphone 610, a smart watch 620) which is capable of driving the optical sensor 430 or a camera only when a user makes a request.

When a user of the user-shooting type electronic device 400 directly runs a camera application during the use of a visually impairment auxiliary function, the electronic device 400 is capable of executing an optical recognition function.

Figure 7:
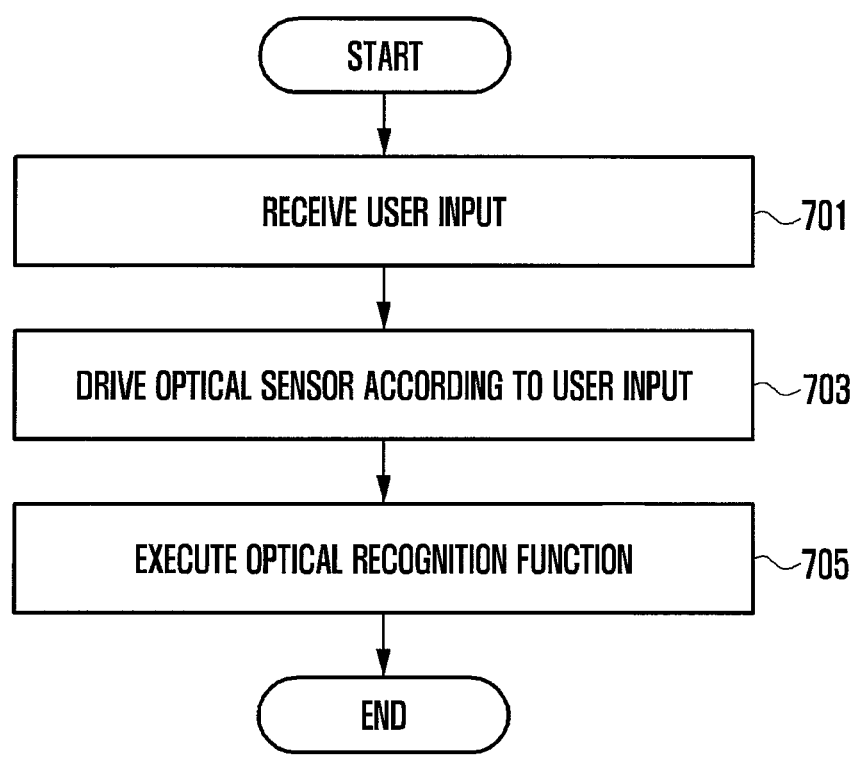
FIG. 7 illustrates a flowchart that describes a method of executing an optical recognition function in a user-shooting type electronic device according to various embodiments of the present disclosure.

FIG. 7 illustrates a flowchart that describes a method of executing an optical recognition function in a user-shooting type electronic device 400 according to various embodiments of the present disclosure.

The electronic device 400 is capable of receiving a user input for operating the optical sensor 430 under the control of the processor 410 in operation 701. The user input may be one or more of the following: a voice input, a gesture input, a touch input, and a key input.

The electronic device 400 operates the optical sensor 430 according to the received user input under the control of the processor 410 in operation 703. When the optical sensor 430 is operated, the electronic device 400 is capable of executing an optical recognition function under the control of the processor 410 in operation 705. Operation 705 may be identical to operation 501 of the embodiment referring to FIG. 5.

Figure 8:
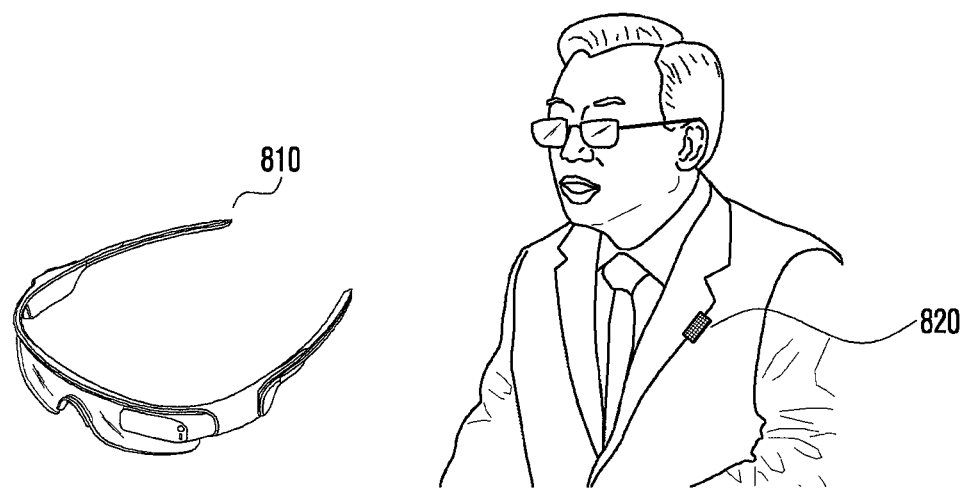
FIG. 8 illustrates a diagram of an always logging type electronic device according to various embodiments of the present disclosure.

FIG. 8 illustrates a diagram of an always logging type electronic device 400 according to various embodiments of the present disclosure.

The always logging type electronic device 400 refers to a device that is capable of operating an optical sensor 430 or a camera, in real-time or periodically, without user input, and executing an optical recognition function.

The always logging type electronic device 400 may refer to a device (e.g., smart eyeglasses 810 or a smart-clip) which is capable of operating the optical sensor 430 or the camera, in real-time or periodically, without user input.

The always logging type electronic device 400 is capable of creating a DB from a user's actions, using a semantic inference program, etc. The always logging type electronic device 400 is capable of accumulating a user's actions in a DB, in a time zone where events are periodically executed, using A-GPS (e.g., a GNSS module included in a communication unit 420), a Bluetooth module (e.g., a Beacon) included in the communication unit 420, an NFC module included in the communication unit 450, a sound sensor (e.g., an ultrasonic sensor using an ultrasonic input device 258 shown in FIG. 2 or a sound sensor using a microphone 460), an infra-red (IR) module (e.g., an infra-red sensor using a proximity sensor 240G shown in FIG. 2, capable of sensing IR), etc. The electronic device 400 is capable of storing the DB of a user's accumulated actions in the storage unit 450 under the control of the processor 410.

The electronic device 400 is capable of identifying a time zone where an event is periodically executed or a specific place, referring to a DB of a user's accumulated actions under the control of the processor 410.

After identifying a time zone where an event is periodically executed or a specific place, the always logging type electronic device 400 is capable of executing an optical recognition function.

Figure 9:
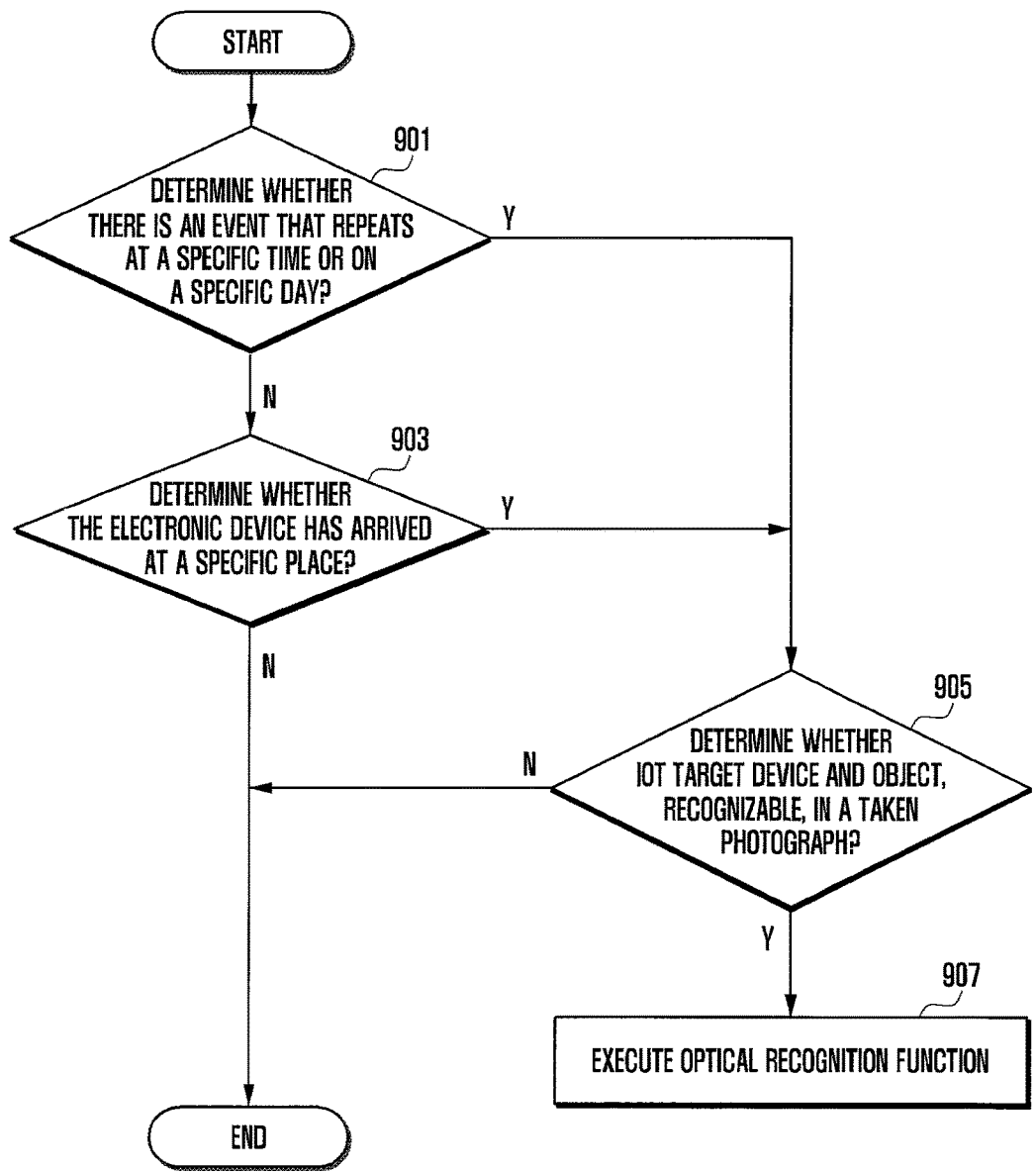
FIG. 9 illustrates a flowchart that describes a method of executing an optical recognition function in an always logging type electronic device according to various embodiments of the present disclosure.

FIG. 9 illustrates a flowchart that describes a method of executing an optical recognition function in an always logging type electronic device 400 according to various embodiments of the present disclosure.

The electronic device 400 is capable of determining whether there is an event that repeats at a specific time or on a specific day under the control of the processor 410 in operation 901.

When the electronic device 400 ascertains that there is no event that repeats at a specific time or on a specific day in operation 901, it determines whether it has arrived at a specific place under the control of the processor 410 in operation 903.

The electronic device 400 is capable of determining whether there is an event that repeats at a specific time or on a specific day or whether it has arrived at a specific place, based on a DB of a user's accumulated actions, stored in the storage unit. The electronic device 400 is capable of determining whether it has arrived at a specific place, using a sensor for detecting a specific place.

When the electronic device 400 ascertains that there is an event that repeats at a specific time or on a specific day or it has arrived at a specific place, it is capable of determining whether there are an IoT target device and an object, recognizable, in the taken photograph, under the control of the processor 410 in operation 905. In another embodiment, when the electronic device 400 ascertains that there is an event that repeats at a specific time or on a specific day or it has arrived at a specific place, it is capable of determining whether there are an IoT target device and an object, recognizable by an optical sensor 430, in the taken photograph, under the control of the processor 410 in operation 905.

The electronic device 400 ascertains that there are an IoT target device and an object, recognizable, it is capable of executing an optical recognition function under the control of the processor 410 in operation 907. Operation 907 may be identical to operation 501 of the embodiment referring to FIG. 5.

When the electronic device 400 ascertains that there is no event that repeats at a specific time or on a specific day or it has not arrived at a specific place, it ends the procedure without performing an optical recognition function. In addition, although the electronic device 400 ascertains that there is an event that repeats at a specific time or on a specific day or it has arrived at a specific place, when an IoT target device and an object, recognizable, are not contained in the taken photograph, the electronic device 400 ends the procedure without performing an optical recognition function.

Figure 10:
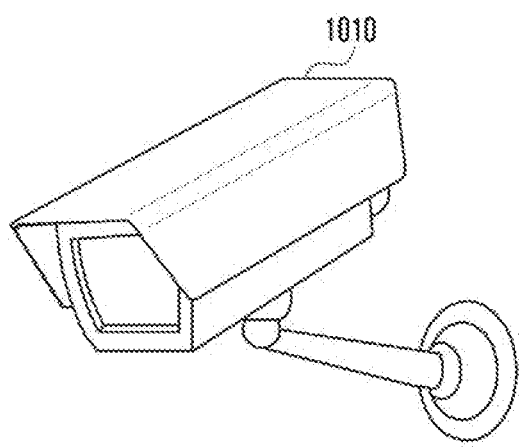
FIG. 10 illustrates a diagram of a fixed location type electronic device according to various embodiments of the present disclosure.

FIG. 10 illustrates a diagram of a fixed location type electronic device 400 according to various embodiments of the present disclosure.

The fixed location type electronic device 400 may refer to a device (e.g., a CCTV 1010) which is capable of always running the optical sensor 430 or a camera, recognizing faces and movement of people, and receives operation signals (or user inputs) from an external device via a communication network.

Figure 11:
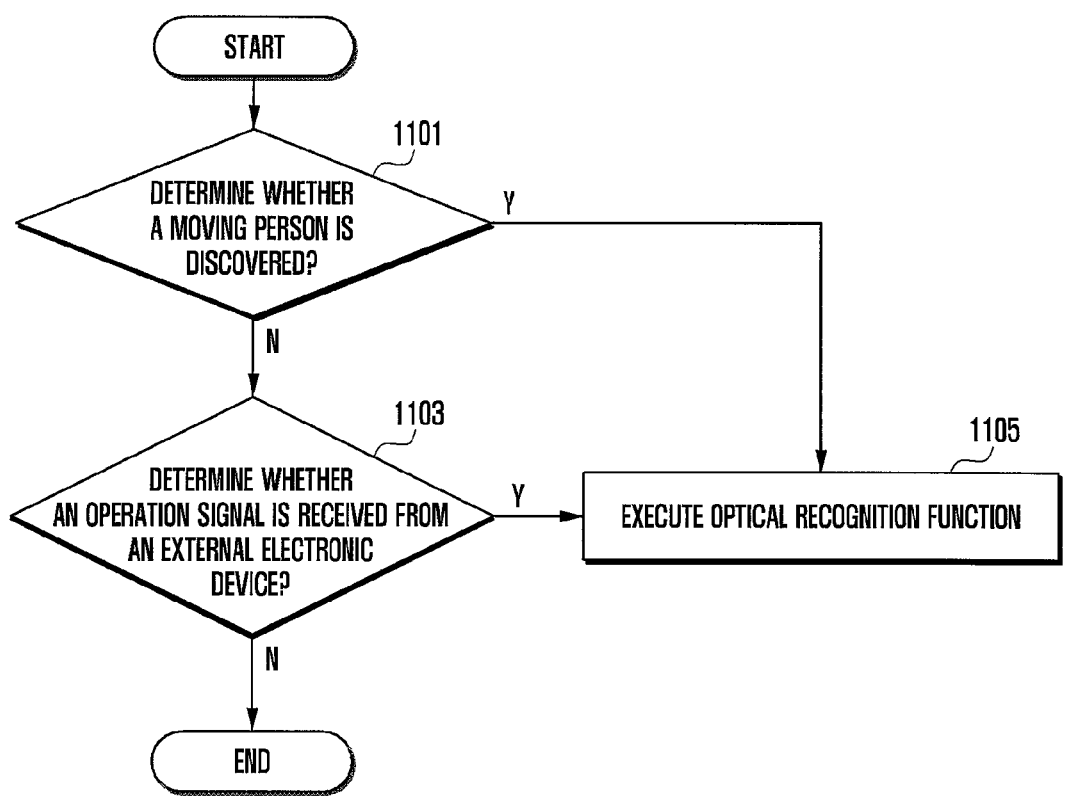
FIG. 11 illustrates a flowchart that describes a method of executing an optical recognition function in a fixed location type electronic device according to various embodiments of the present disclosure.

FIG. 11 illustrates a flowchart that describes a method of executing an optical recognition function in a fixed location type electronic device 400 according to various embodiments of the present disclosure.

The electronic device 400 is capable of determining whether it discovers a moving person, a face of a person, or a person, via the optical sensor 430 under the control of the processor 410 in operation 1101.

When the electronic device 400 ascertains that it has not discovered a moving person, a face of a person, or a person, in operation 1101, it is capable of determining whether it receives an operation signal (or a user input) from an external electronic device under the control of the processor 410 in operation 1103. The operation signal or user input may be at least one of the following: a voice input, a gesture input, a touch input, and a key input.

On the other hand, when the electronic device 400 ascertains that it has discovered a moving person, a face of a person, or a person, in operation 1101, or it has received an operation signal (or a user input) from an external electronic device in operation 1103, it is capable of executing an optical recognition function under the control of the processor 410 in operation 1105. Operation 1105 may be identical to operation 501 in the embodiment referring to FIG. 5.

When the electronic device 400 ascertains that it has not discovered a moving person, a face of a person, or a person, in operation 1101 or it has not received an operation signal (or a user input) from an external electronic device in operation 1103, it ends the procedure without performing an optical recognition function.

According to various embodiments of the present disclosure, since the electronic device based on optical object recognition and the method of operating the electronic device are capable of controlling IoT devices by voice, thereby providing the barrier free use of IoT devices to users with congenital or postnatal visual impairment.

The term "module" as used in the present disclosure may mean a unit including one of hardware, software, and firmware or any combination of two or more of them. For example, the "module" may be interchangeable with the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" may include at least one of an application-specific integrated circuit (ASIC) chip, a field-programmable gate arrays (FPGA), and a programmable-logic device for performing certain operations, which are now known or will be developed in the future.

Part of the method (e.g., operations) or system (e.g., modules or functions) according to various embodiments of the present disclosure can be implemented with instructions that can be conducted via various types of computers and stored in computer-readable storage media, as types of programming modules. One or more processors (e.g., processor 120) can execute instructions, thereby performing the functions. An example of the computer-readable storage media may be a memory 130.

Examples of the computer-readable storage media include: magnetic media, such as hard disks, floppy disks, and magnetic tape; optical media such as Compact Disc Read Only Memory (CD-ROM) disks and Digital Versatile Disc (DVD); magneto-optical media, such as floptical disks; and hardware devices that are specially configured to store and perform program instructions (e.g., programming modules), such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to various embodiments of the present disclosure may include one or more components, remove part of them described above, or include new components. The operations performed by modules, programming modules, or the other components, according to various embodiments of the present disclosure, may be executed in serial, parallel, repetitive or heuristic fashion. Part of the operations can be executed in any other order, skipped, or executed with additional operations. The embodiments of the present disclosure described in the description and drawings along with particular terms are merely provided to assist in a comprehensive understanding of the disclosure and are not suggestive of limitation. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating an electronic device based on optical object recognition comprising:
    executing an optical recognition function;
    recognizing an object outside the electronic device via an optical sensor;
    computing outward form information regarding the recognized object based on stored outward form information in a database;
    identifying the recognized object based on the computed outward form information regarding the object;
    searching for an Internet of Things (IoT) target device related to the identified object;
    recommending an IoT action related to the identified object;
    automatically preparing for and executing the IoT action; and
    performing voice feedback regarding the IoT action and the IoT target device.

2. The method of claim 1, wherein performing voice feedback comprises:
    outputting, by voice, a guide message regarding details for the IoT action and the IoT target device.

3. The method of claim 1, wherein recognizing an object comprises:
    comparing the computed outward form information regarding the object with object outward form information stored in a database to identify the object.

4. The method of claim 1, wherein searching for an IoT target device further comprises:
    comparing the computed outward form information regarding the object with information regarding IoT target devices stored in a database to identify the IoT target device.

5. The method of claim 1, wherein recommending an IoT action related to the identified object comprises:
    when the object and the IoT target device are recognized, recommending the IoT action that the IoT target device can perform in connection with the identified object by referring to a database of scenarios related to IoT actions.

6. The method of claim 1, wherein executing an optical recognition function comprises:
    receiving a user input for driving the optical sensor;
    driving the optical sensor according to the received user input; and
    when the optical sensor is driven, executing the optical recognition function.

7. The method of claim 1, wherein executing an optical recognition function comprises:
    determining whether there is an event that repeats at a specific time or on a specific day;
    determining whether the electronic device has arrived at a specific place;
    when ascertaining that there is an event that repeats at a specific time or on a specific day or that the electronic device has arrived at a specific place, determining whether there are an IoT target device or an object recognizable by the optical sensor; and
    when ascertaining that there are an IoT target device or an object recognizable by the optical sensor, executing the optical recognition function.

8. The method of claim 1, wherein executing an optical recognition function comprises:
    determining whether the electronic device discovers a moving person, a face of a person, or a person, via the optical sensor;
    determining whether the electronic device receives an operation signal from an external electronic device; and
    when the electronic device discovers a moving person, a face of a person, or a person or receives an operation signal, executing the optical recognition function.

9. The method of claim 6, wherein the user input comprises at least one of a voice input, a gesture input, a touch input, or a key input.

10. The method of claim 1, wherein the IoT target device comprises the electronic device or an external device.

11. An electronic device based on optical object recognition comprising:
    an optical sensor;
    a speaker;
    a microphone;
    a radio frequency (RF) module;
    a memory; and
    a processor configured to:
        execute an optical recognition function;
        recognize an object outside the electronic device, via and optical sensor;
        compute outward form information regarding the recognized object based on stored outward form information in a database;
        identify the recognized object based on the computed outward form information regarding the object;
        search for an Internet of Things (IoT) target device related to the identified object;
        recommend an IoT action related to the identified object;
        automatically prepare for and execute the IoT action; and
        control the speaker to perform voice feedback regarding the IoT action and the IoT target device.

12. The electronic device of claim 11, wherein the processor is configured to control the speaker to output, by voice, a guide message regarding details for the IoT action and the IoT target device.

13. The electronic device of claim 11, wherein the processor is further configured to:
    compare the computed outward form information regarding the recognized object with object outward form information stored in a database stored in the memory to identify the recognized object.

14. The electronic device of claim 11, wherein the processor is further configured to:
    compare the computed outward form information regarding the object with information regarding IoT target devices stored in a database stored in the memory to identify the IoT target device.

15. The electronic device of claim 11, wherein the processor is configured to:
    recognize the object and the IoT target device; and
    recommend the IoT action that the IoT target device can perform in connection with the identified object by referring to a database of scenarios related to IoT actions stored in the memory.

16. The electronic device of claim 11, wherein the processor is configured to:
control a user input unit or the microphone to receive user input for driving the optical sensor;
drive the optical sensor according to the received user input; and
execute, when the optical sensor is driven, the optical recognition function.

17. The electronic device of claim 11, wherein the processor is configured to:
determine whether there is an event that repeats at a specific time or on a specific day;
determine whether the electronic device has arrived at a specific place;
determine, when ascertaining that there is an event that repeats at a specific time or on a specific day or that the electronic device has arrived at a specific place, whether there are an IoT target device and an object recognizable by the optical sensor; and
execute the optical recognition function when ascertaining that there are an IoT target device and an object recognizable by the optical sensor.

18. The electronic device of claim 11, wherein the processor is configured to:
determine whether the electronic device discovers a moving person, a face of a person, or a person, via the optical sensor;
determine whether the electronic device receives an operation signal from an external electronic device via the RF module; and
execute the optical recognition function when the electronic device discovers a moving person, a face of a person, or a person or receives an operation signal.

19. The electronic device of claim 16, wherein the user input comprises at least one of a voice input, a gesture input, a touch input, or a key input.

20. The electronic device of claim 11, wherein the IoT target device comprises the electronic device or an external device.

* * * * *